US007234639B2

(12) United States Patent
Schultz et al.

(10) Patent No.: US 7,234,639 B2
(45) Date of Patent: Jun. 26, 2007

(54) STORED-VALUE CARD WITH WHISTLE

(75) Inventors: Mark A. Schultz, Burnsville, MN (US); Kim O. Lindahl, Golden Valley, MN (US); Timothy P. Clegg, Manhatten Beach, CA (US)

(73) Assignee: Target Brands, Inc., Minneapolis, MN (US)

( * ) Notice: Subject to any disclaimer, the term of this patent is extended or adjusted under 35 U.S.C. 154(b) by 187 days.

(21) Appl. No.: 11/166,587

(22) Filed: Jun. 24, 2005

(65) Prior Publication Data

US 2006/0289655 A1 Dec. 28, 2006

(51) Int. Cl.
*G06K 5/00* (2006.01)

(52) U.S. Cl. ...................... 235/380; 235/487; 235/492; 116/24

(58) Field of Classification Search ............... D10/119; 235/493; 116/24
See application file for complete search history.

(56) References Cited

U.S. PATENT DOCUMENTS

| | | | | |
|---|---|---|---|---|
| 2,019,425 | A | 10/1935 | Luce | |
| 2,529,661 | A | 11/1950 | Millstein | |
| 2,619,865 | A | 12/1952 | Lynch | |
| 3,323,251 | A | 6/1967 | Henry | |
| D230,318 | S | 2/1974 | Kissin | |
| 4,019,277 | A | 4/1977 | Kenkelen | |
| 4,490,123 | A | 12/1984 | Becker et al. | |
| 4,779,568 | A | 10/1988 | Finger, Jr. | |
| 5,113,784 | A | 5/1992 | Forselius | |
| 5,533,757 | A | 7/1996 | Morris | |
| D447,076 | S | 8/2001 | Matlock | |
| 6,489,545 | B1 | 12/2002 | Hart et al. | |
| 7,055,740 | B1 * | 6/2006 | Schultz et al. | 235/381 |
| 2004/0079275 | A1 | 4/2004 | Falla | |

FOREIGN PATENT DOCUMENTS

| | | |
|---|---|---|
| GB | 2 277 482 | 11/1994 |

* cited by examiner

*Primary Examiner*—Seung Ho Lee
(74) *Attorney, Agent, or Firm*—Ingrassis Fisher & Lorenz, P.C.

(57) ABSTRACT

A stored-value card includes a housing and at least one internal wall substantially enclosed within the housing. The housing includes an account identifier signifying a financial account or record linked to the stored-value card. The at least one internal wall is configured to define an airflow chamber within the housing. The housing defines an opening leading into the airflow chamber. The stored-value card is configured to produce a whistle sound when air enters the airflow chamber from the opening and moves within the airflow chamber.

20 Claims, 9 Drawing Sheets

STORED-VALUE CARD WITH WHISTLE

BACKGROUND OF THE INVENTION

Stored-value cards and other financial transactions cards come in many forms. A gift card, for example, is a type of stored-value card that includes pre-loaded or selectively loaded monetary value. In one example, a customer buys a gift card having a specified value for presentation as a gift to another person. In another example, a customer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention provides a stored-value card. The stored-value card includes a housing and at least one internal wall substantially enclosed within the housing. The housing includes an account identifier signifying a financial account or record linked to the stored-value card. The at least one internal wall is configured to define an airflow chamber within the housing. The housing defines an opening leading into the airflow chamber. The stored-value card is configured to produce a whistle sound when air enters the airflow chamber from the opening and moves within the airflow chamber.

BRIEF DESCRIPTION OF THE DRAWINGS

Embodiments of the invention will be described with respect to the figures, in which like reference numerals denote like elements, and in which.

DETAILED DESCRIPTION

A gift card, financial transaction card, or other stored-value card is adapted for making purchases of goods and/or services from e.g. a retail store or website. According to one embodiment, an original consumer buys a stored-value card to give a recipient who in turn is able to use the stored-value card at the retail store or other setting to pay for goods and/or services. A stored-value card, according to embodiments of the present invention, provides the consumer or recipient with extra amusement in addition to the ability to pay for goods and/or services with the stored-value card. In particular, the stored-value card presents the original consumer and the recipient with a whistle. In one embodiment, the presentation of the stored-value card with the whistle promotes the sale and/or loading of the stored-value card by potential consumers and/or bearers of the stored-value card.

Figure 1:
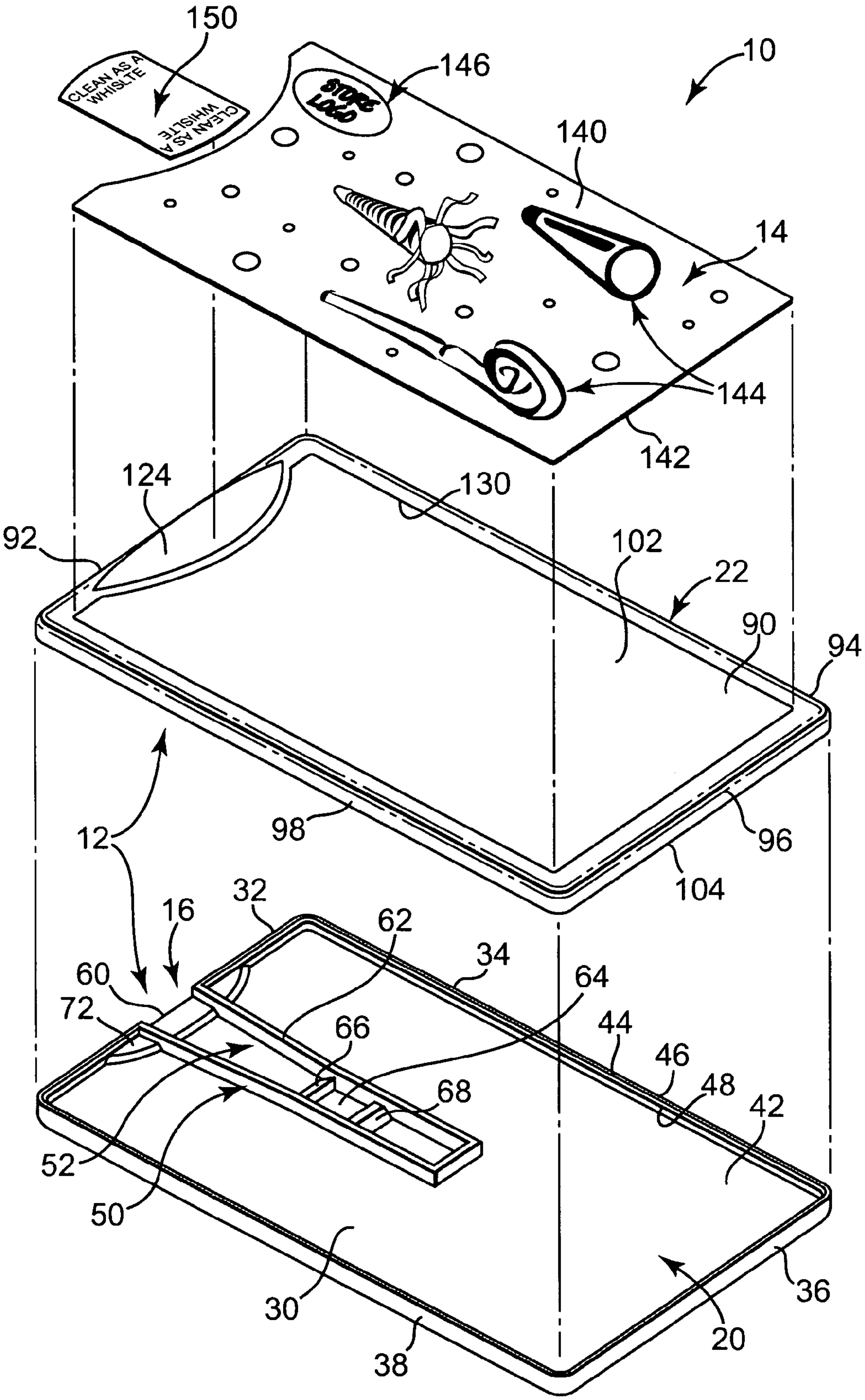
FIG. 1 is an exploded, top perspective view of one embodiment of the stored-value card, according to the present invention.

Turning to the figures, FIG. 1 is an exploded, top perspective view of one embodiment of a stored-value card 10 according to the present invention. Stored-value card 10 includes a housing 12 and a face panel 14 and defines a whistle 16 substantially enclosed within and/or defined by housing 12. Whistle 16 is configured to produce a whistle sound when a bearer of the stored-value card 10 blows or otherwise introduces airflow into whistle 16. Face panel 14 is optionally coupled to housing 12 to provide stored-value card 10 with indicia relating to one or more of an occasion, season, store identifier, brand identifier, media format identifier (e.g. characters, logos, scenes, or other illustrations relating to at least one of a movie, television show, book, video game, etc.), character, etc. In one embodiment, indicia on face panel 14 refer either directly or indirectly to whistle 16 of stored-value card 10.

Figure 2A:
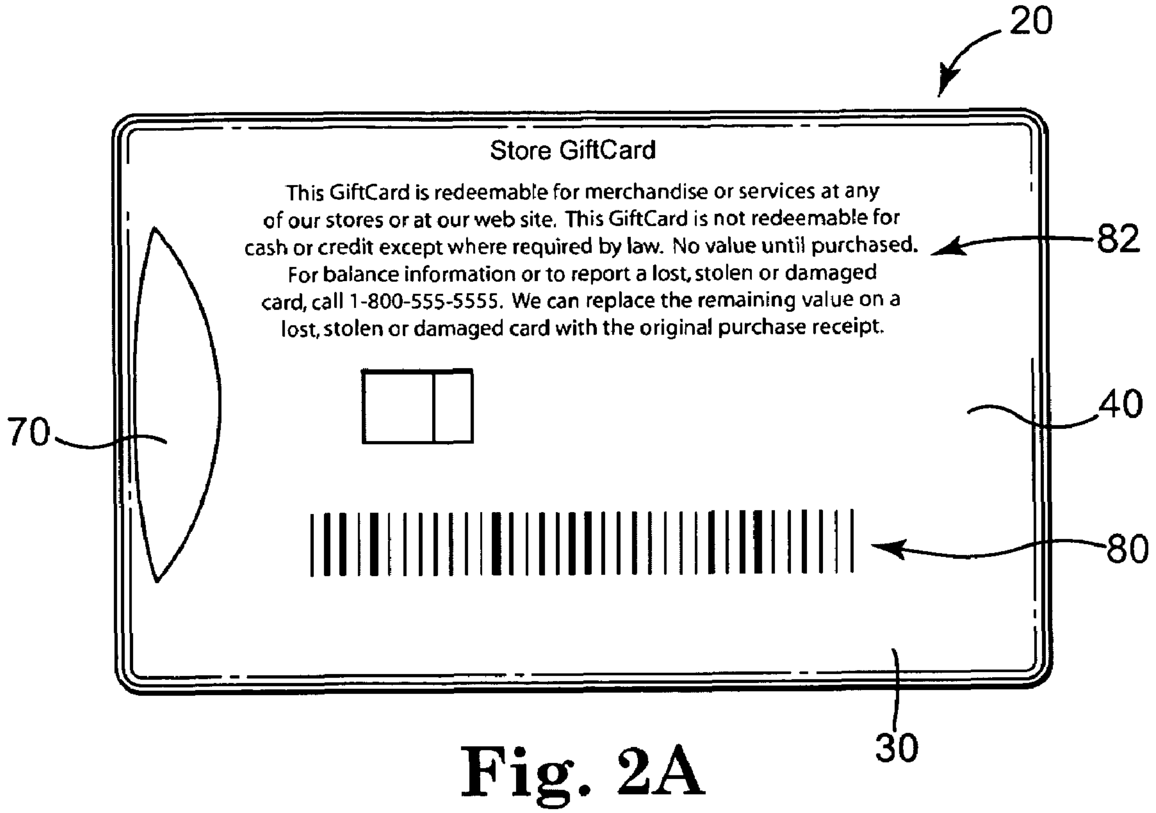
FIG. 2A is a bottom view of one embodiment of a base of the stored-value card of FIG. 1, according to the present invention.
Figure 2B:
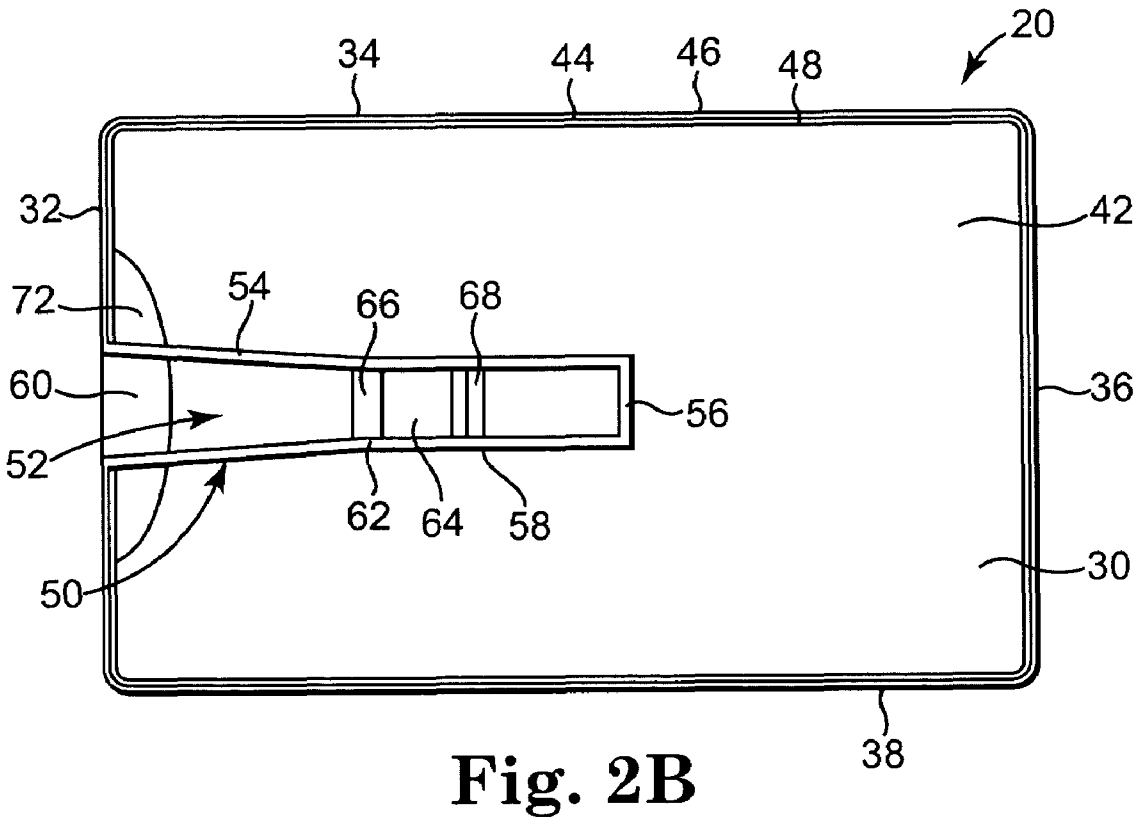
FIG. 2B is a top view of one embodiment of the base of FIG. 2A.

Housing 12 includes a first housing member 20 and a second housing member 22. In one embodiment, first housing member 20 is a base and second housing member 22 is a cover. One embodiment of base 20 is illustrated in FIGS. 2A and 2B. Base 20 generally includes a primary panel 30 and side walls 32, 34, 36, and 38. Primary panel 30 is substantially planar and defines an outside surface 40 and an inside surface 42 opposite outside surface 40. In one embodiment, primary panel 30 is substantially rectangular and sized similarly to an identification card, a credit card, or other card sized to fit in a wallet of a user. In other embodiments, primary panel 30 is shaped as a square, circle, oval, star, or any other suitable shape.

Side walls 32, 34, 36, and 38 each extend from inside surface 42 away from outside surface 40 and collectively extend about a majority of the perimeter of primary panel 30. In one embodiment, each side wall 32, 34, 36, and 38 extends with a substantially perpendicular orientation relative to primary panel 30. In particular, first side wall 32 extends substantially parallel to and is positioned opposite third sidewall 36. Second side wall 34 and fourth side wall 38 each extend between first side wall 32 and third side wall 36 opposite and substantially parallel to one another.

Side walls 32, 34, 36, and 38 each extend from primary panel 30 to collectively define an inside edge 44 opposite primary panel 30. In one example, inside edge 44 is formed as a stepped edge including a first portion 46 and a second portion 48. First portion 46 extends from primary panel 30 a further distance than second portion 48 extends from primary panel 30, as illustrated with additional reference to FIG. 1. In one example, first portion 46 extends generally about the perimeter of second portion 48. In this respect, inside edge 44 is formed as a stepped edge with the lower, second portion 48 being positioned just inside higher, first portion 46. In one embodiment, at least first portion 46 forms curved or chamfered corners at the intersection of each side wall 32, 34, 36, and 38 with another of side walls 32, 34, 36, and 38.

In one example, at least a portion of whistle 16 is defined by base 20. In one embodiment, base 20 defines a plurality of internal walls 50 extending from inside surface 42 of primary panel 30 in substantially the same direction that side walls 32, 34, 36, and 38 extend from inside surface 42. Internal walls 50 are arranged to at least partially define an airflow chamber 52 between them. As such, internal walls 50 provide an example of means for defining airflow chamber 52. For example, the plurality of internal walls 50 include a first internal wall 54, a second internal wall 56, and a third internal wall 58. First internal wall 54 extends through and from first side wall 32 toward third side wall 36. Second internal wall 56 extends from first internal wall 54 opposite first side wall 32 generally toward fourth side wall 38. Third internal wall 58 extends from second internal wall 56 opposite first internal wall 54 and back towards and through first side wall 32. Accordingly, an opening 60 is defined in first side wall 32 between first and third internal walls 54 and 58. Internal walls 50 collectively define an inside edge 62 opposite primary panel 30.

An exit aperture or opening 64 is formed within airflow chamber 52. Exit opening 64 is spaced from opening 60 and allows air to exit airflow chamber 52. In one embodiment, a first beveled surface 66 and a second beveled surface 68 are positioned on either side of exit opening 64. In particular, in one embodiment, first beveled surface 66 extends from one side of exit opening 64 relatively near first side wall 32 and extends an increasing distance from primary panel 30 as first beveled surface 66 nears exit opening 64.

Second beveled surface 68 extends from primary panel 30 on the opposite side of exit opening 64 as first beveled surface 66. Second beveled surface 68 extends an increasing distance from primary panel 30 as second beveled surface 68 nears exit opening 64. Other bevels and/or ramps may also be formed within airflow chamber 52 to direct air through airflow chamber 52 as desired to produce a whistling sound having a desired frequency or pitch. In one embodiment, a top or other member (not illustrated) may be formed over airflow chamber 52 to interact with inside edge 62 of internal walls 50 to entirely form airflow chamber 52 by base 20.

In one embodiment, outside surface 40 of primary panel 30 defines an area of indentation or relief 70 which tapers outside surface 40 near opening 60 in first side wall 32. Accordingly, base 20 is thinner at and/or near whistle opening 60 than at other portions of base 20. Relief area 70 on outside surface 40 conversely defines a ramp 72 on inside surface 42 of base 20. In particular, ramp 72 extends from a higher point (i.e. a point extending further from primary panel 30) near opening 60 to a lower point (i.e. a point positioned relatively nearer primary panel 30) relatively near exit opening 64.

Outside surface 40 includes an account identifier 80 such as a barcode, magnetic strip, a smart chip, or other electronic device, a radio frequency identification (RFID) device, or other suitable device readily readable by a point-of-sale terminal, account access station, kiosk, or other suitable device. In one embodiment, account identifier 80 is printed or otherwise disposed on outside surface 40 of base 20. Account identifier 80 indicates a financial account or record to which stored-value card 10 is linked. The account or record maintains the monetary balance on stored-value card 10 and is optionally stored on a database, other electronic or manual record-keeping system, or in the case of "smart" cards for example, on a chip or other electronic device on stored-value card 10 itself. Accordingly, by scanning account identifier 80, a financial account or record linked to stored-value card 10 is identified and can subsequently be activated, have amounts debited therefrom, and/or have amounts added thereto. With the above in mind, account identifier 80 is one example of means for linking stored-value card 10 with a financial account or record.

In one embodiment, redemption indicia 82 are included on outside surface 40 of base 20. Redemption indicia 82 indicate that stored-value card 10 is redeemable for the purchase of goods and/or services and that, upon use, a value of the purchased goods and/or services will be deducted from the financial account or record linked to stored-value card 10. In one embodiment, redemption indicia 82 include phrases such as "<NAME OF STORE> GIFTCARD" and "This GiftCard is redeemable for merchandise or services at any of our stores or at our website," and/or provides help or telephone information in the case of a lost, stolen, or damaged stored-value card, etc. In one embodiment, other indicia are printed or otherwise disposed on outside surface 40 of base 20 including other objects, text, backgrounds, graphics, brand identifiers, etc.

Figure 3A:
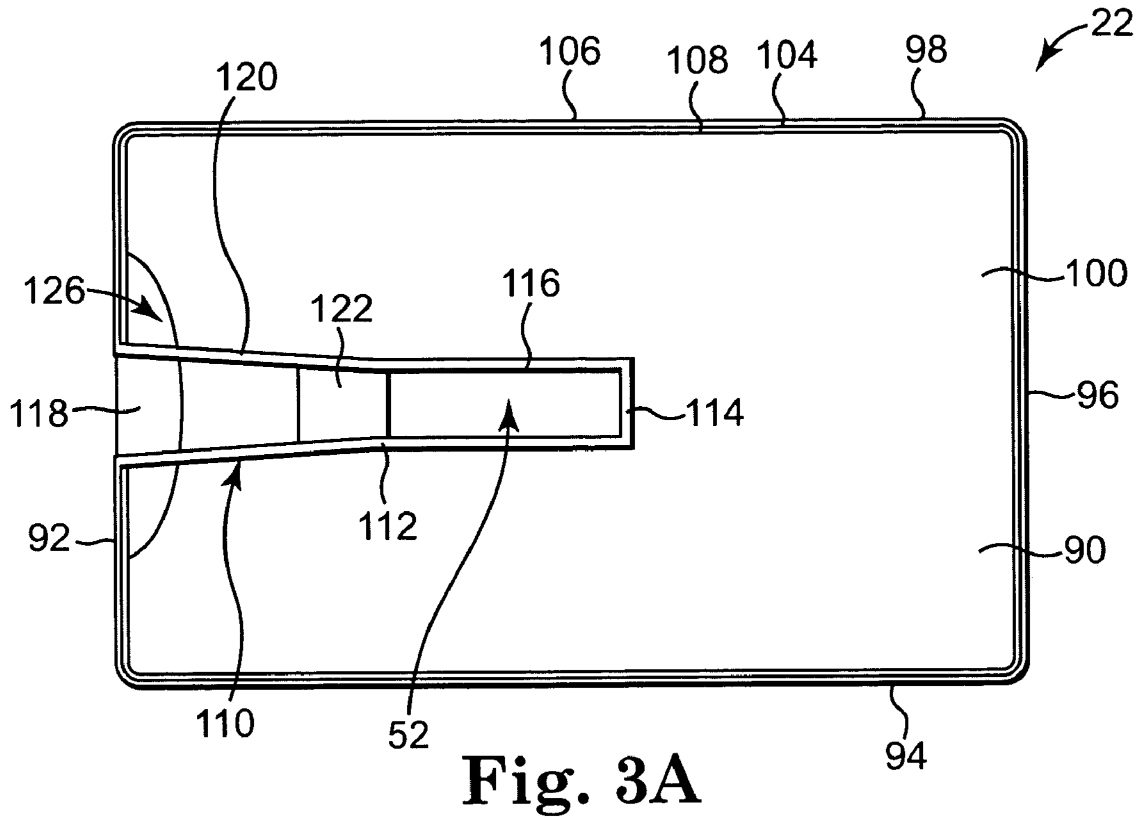
FIG. 3A is a bottom view of one embodiment of a cover of the stored-value card of FIG. 1, according to the present invention.
Figure 3B:
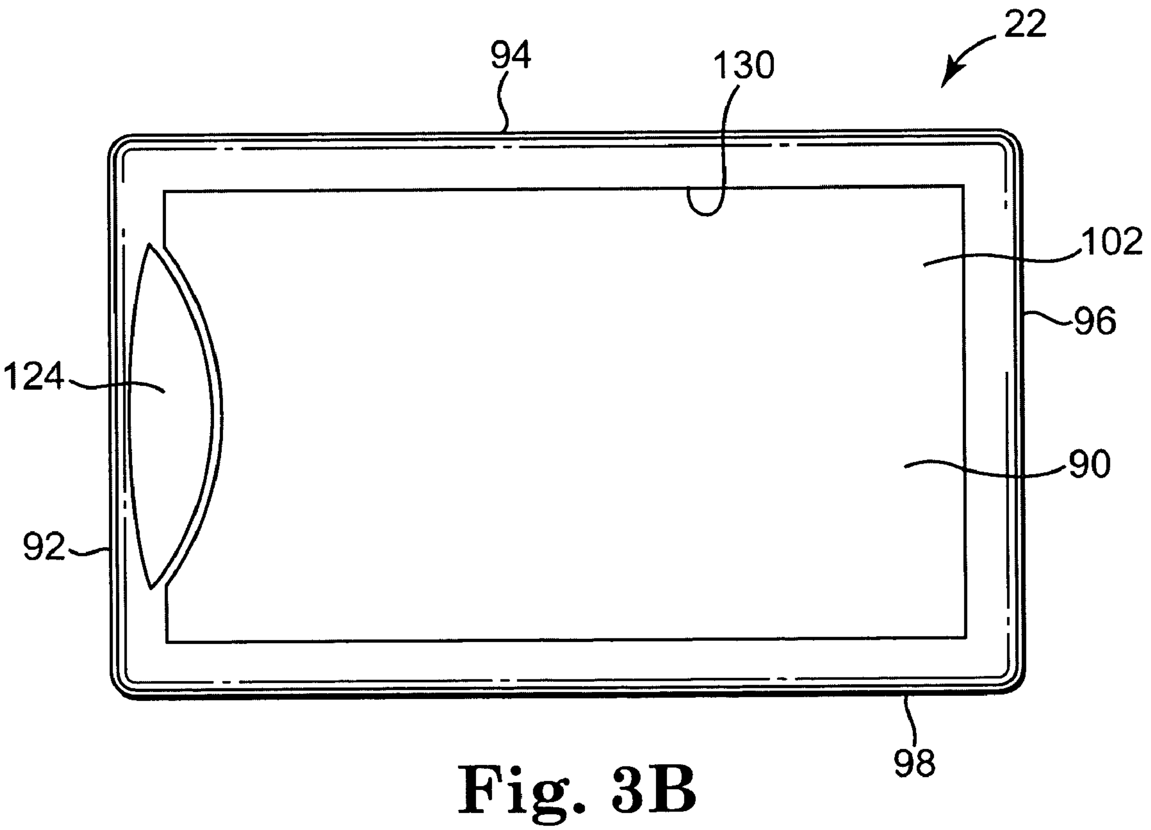
FIG. 3B is a top view of one embodiment of the cover of FIG. 3A.

One embodiment of cover 22 is illustrated in FIGS. 3A and 3B. Cover 22 generally includes a primary panel 90 and side walls 92, 94, 96, and 98. Primary panel 90 is substantially planar and defines an inside surface 100 and an outside surface 102 opposite inside surface 100. In one embodiment, primary panel 90 is generally sized similarly to primary panel 30 of base 20. Each side wall 92, 94, 96, and 98 extends from inside surface 100, and side walls 92, 94, 96, and 98 collectively extend generally about a substantial portion of the perimeter of primary panel 90. For example, each side wall 92, 94, 96 and 98 extend with a substantially perpendicular orientation relative to primary panel 90. In particular, first side wall 92 is positioned opposite and substantially parallel to third side wall 96. Second side wall 94 and fourth side wall 98 each extend between first side wall 92 and third side wall 96 opposite and substantially parallel to one another.

Each side wall 92, 94, 96, and 98 extends from primary panel 90 to collectively form an inside edge 104 opposite primary panel 90. In one embodiment, inside edge 104 is a stepped edge including a first portion 106 and a second portion 108. In one embodiment, first portion 106 extends from primary panel 90 a smaller distance than second portion 108 extends from primary panel 90. First portion 106 extends around the perimeter of second portion 108. In this respect, inside edge 104 is formed as a stepped edge with higher, second portion 108 being positioned just inside lower, first portion 106. In one embodiment, the corners of inside edge 104 formed at the intersections of side walls 92, 94, 96, and 98 with another of side walls 92, 94, 96, and 98 are rounded or chamfered.

In one embodiment, at least a portion of whistle 16 is defined by cover 22. In one example, cover 22 defines a plurality of internal walls 110 extending from inside surface 100 of primary panel 90 in substantially the same direction that side walls 92, 94, 96, and 98 extend from inside surface 100. Internal walls 110 are arranged to at least partially define airflow chamber 52 between them. As such, internal walls 110 alone or collectively with internal walls 50, as will be further described below, provide an example of means for defining airflow chamber 52. For example, the plurality of internal walls 110 include a first internal wall 112, a second internal wall 114, and a third internal wall 116. First internal wall 112 extends through and from first side wall 92 toward third side wall 96. Second internal wall 114 extends from first internal wall 112 opposite first side wall 92 generally toward fourth side wall 98. Third internal wall 116 extends from second internal wall 114 opposite first internal wall 112 and back towards and through first side wall 92. Accordingly, an opening 118 is defined in first side wall 92 between first and third internal walls 92 and 96. Internal walls 110 collectively define an inside edge 120 opposite primary panel 90.

A beveled surface 122 is positioned between internal walls 110. More particularly, beveled surface 122 extends from primary panel 90 an increasing distance as beveled surface 122 extends further away from opening 118. For example, beveled surface 122 is positioned to be substantially adjacent or near to exit opening 64 when base 20 is mated with cover 22. In one example, beveled surface 122 is positioned to align with at least a portion of beveled surface first of base 20 when base 20 and cover 22 are mated. Other bevels and/or ramps may also be formed within airflow chamber 52 to direct air through airflow chamber 52 as desired to product a whistling sound having a desired frequency or pitch.

For instance, outside surface 102 of primary panel 90 defines an area of indentation or relief 124 which tapers outside surface 102 near opening 118 in first side wall 92. Accordingly, cover 22 is thinner at and/or near whistle opening 118 than at other portions of cover 22. Relief area 124 on outside surface 102 conversely defines a ramp 126 on inside surface 100 of primary panel 90. In particular, ramp 126 extends from a higher point (i.e., a point extending relatively further from primary panel 90) near opening 118 to a lower point (i.e. a point positioned relatively nearer primary panel 90) of relatively near beveled surface 122.

In one embodiment, a panel indentation 130 is defined on outside surface 102 of cover 22 and is sized and configured to receive face panel 14. In one embodiment, outside surface 102 is printed with or otherwise includes indicia relating to at least one of a brand, store identifier, holiday, occasion, media format identifier, sport, identifier of the inclusion of whistle 16, etc.

In one embodiment, each of base 20 and cover 22 is formed by injection molding a plastic such as PVC or any other suitable material to define the various attributes of base 20 and cover 22. Other methods of forming base 20 and cover 22 are also contemplated. In one embodiment, in which base 20 is formed by injection molding, account identifier 80, redemption indicia 82, and any other indicia or information are printed onto the injection molded base 20. In one example, base 20 and cover 22 are each formed to be substantially rigid.

In one example, base 20 and cover 22 are each formed of materials having a similar or identical color. In other examples, base 20 and cover 22 may be formed of materials having different coloring. For instance, in one embodiment, base 20 is colored white to best display the printed account identifier 80, redemption indicia 82, etc. while cover 22 is a different color. In one embodiment, cover 22 is colored to correspond with and/or complement the coloring of face panel 14.

Face panel 14 is substantially planar and is formed of a paper, plastic, or other suitable material. In one embodiment, face panel 14 is sized to fit within panel indentation 130 of cover 22. With this in mind, face panel 14 includes a first or outer surface 140 and a second or inner surface 142. First surface 140 includes indicia such as decorative indicia 144, brand indicia 146, etc. In one embodiment, decorative indicia 144 relate to a particular occasion, such as a wedding, new baby, graduation, holiday, season, brand identifier, media format identifier, birthday, or other visual design to promote purchase of stored-value card 10.

In one example, decorative indicia 144 include a picture or a graphic referring to the inclusion of whistle 16 in stored-value card 10. In particular, decorative indicia 144 may include a graphic or photo of noisemakers or other items indicating the inclusion of a noise or sound maker within stored-value card 10. Decorative indicia 144 may encompass a majority of face panel 14 and include all or a portion of a character, object, etc. Decorative indicia 144 associate stored-value card 10 with at least one of a product brand, a store, a holiday, a season, an occasion, a media format identifier, etc. Brand indicia 146 identify a brand associated with stored-value card 10, such as identifying a product brand, a store brand, etc.

Other combinations or selections of indicia to be displayed on face panel 14 are also contemplated. In an alternative embodiment, indicia described to be included on face panel 14 are directly printed to cover 22. In one embodiment, first, outer surface 140 of face panel 14 is printed and finished in any one of a variety of manners such as dull, matte, gloss, textured, or other effect finish. In one embodiment, the finish chosen for first, outer surface 140 further complements the indicia included on first, outer surface 140.

Second, inner surface 142 of face panel 14 is configured to interface with cover 22 within panel indentation 130. In one embodiment, face panel 14 is adhered to cover 22 with any suitable adhesive or other attachment means. In other embodiments, face panel 14 is formed of an adhesive-backed plastic, paper, cardstock, etc. and is directly applied and adhered to cover 22.

During assembly, cover 22 is placed upon base 20, or vice versa. In particular, base 20 is placed on cover 22 such that inside edge 44 of base 20 interfaces with inside edge 104 of cover 22. More specifically, first portion 46 and second portion 48 of inside edge 44 interface with first portion 106 and second portion 108 (illustrated in FIG. 3A) of inside edge 104, respectively. The stepped interface provides for a stable and generally neat coupling of base 20 and cover 22. In one embodiment, an adhesive or other attachment means is applied between inside edges 44 and 104 to secure base 20 to cover 22. Use of other attachment means, such as attachment devices, screws, rivets, etc. is also contemplated to couple base 20 with cover 22.

Referring to FIG. 1 in view of FIG. 3A, when base 20 is secured to cover 22, inside edge 62 formed by internal wall 50 of base 20 interfaces with inside edge 120 formed by internal walls 110 of cover 22. In this respect, airflow chamber 52 is collectively defined between inside surface 42 of primary panel 30, base internal walls 50, cover internal walls 110, and inside surface 100 of primary panel 90. Moreover, opening 60 of base 20 is aligned with and placed adjacent to opening 118 of cover 22. As such, openings 60 and 118 collectively define a larger opening for introducing air into airflow chamber 52. In one embodiment, relief area 70 of base 20 and relief area 124 of cover 22 also substantially align to form a tapered or thinner area or mouthpiece about openings 60 and 118. In this respect, stored-value card 10 is formed to allow a bearer of stored-value card 10 to easily place their mouth over or around openings 60 and 118 to blow or otherwise introduce air into airflow chamber 52.

In one embodiment, ramp 126 formed by cover 22 also substantially aligns with or extends towards exit opening 64 formed in base 20. In addition, ramps 72 and 126 at least partially align with one another when base 20 is coupled to cover 22. As such, ramps 72 and 126, as well as beveled surfaces 66, 68, and 122 interact with each other to form airflow chamber 52 in a manner creating an airflow pattern within airflow chamber 52 to create a whistle sound. In particular, in one embodiment, base 20 and cover 22 interface to collectively form and enclose whistle 16 in which air or other gas enters airflow chamber through openings 60 and 118 travels throughout, airflow chamber 52, and eventually escapes airflow chamber 52 through exit opening 64 producing a whistle-like sound. In one embodiment, ramps 72 and 126 and beveled surfaces 66, 68, and 122 deter air from linearly moving from openings 60 and 118 to exit opening 64. As such, the airflow is non-linear and moves or whirls within airflow chamber 52 to produce the desired whistle sound.

Accordingly, base 20 and cover 22, i.e. housing 12, provides one example of means for substantially enclosing airflow chamber 52. Similarly, openings 60, 118, and/or 64 each alone or collectively provide an example of means for externally accessing airflow chamber 52. More specifically, openings 60 and/or 118 provide one example of means for introducing air into airflow chamber 52, and exit opening 64 provides an example of means for exiting air from airflow chamber 52. Ramps 72 and 126 and beveled surfaces 66, 68, and 122 each provide one example of means for directing airflow with the airflow chamber, and more particularly, in some instances, of means for interrupting the otherwise linear flow of air through the airflow chamber 52.

In other embodiments, a single opening is formed and interfaces with airflow chamber 52 through which air enters and exits airflow chamber 52 through the single opening. In yet another embodiment, additional openings may be periodically placed throughout airflow chamber 52 in a manner configured to be selectively covered by a bearer's fingers to change the pitch or frequency of the whistle produced by whistle 16.

Following securing of base 20 to cover 22, face panel 14 is applied to outside surface 102 of cover 22. In particular, face panel 14 is fit and adhered within panel indentation 130. In other embodiments, face panel 14 is applied to cover 22 before assembling cover 22 with base 20.

As illustrated in FIG. 1, in one embodiment, stored-value card 10 additionally includes a sticker 150 for covering the mouthpiece of stored-value card 10. Sticker 150 is adhered to base 20 about opening 60, extends around and over first side wall 32. Sticker 150 is further adhered to first side wall 92 and over opening 118 of cover 22. Sticker 150 substantially protects the mouthpiece from being contaminated by consumers or other bearers of stored-value card 10 attempting to use whistle 16. Sticker 150 is removable such that upon purchase of stored-value card 10 and/or presentation of stored-value card 10 to a consumer or recipient, the current bearer of the card can use whistle 16 with a decreased worry of bacteria or other contamination caused by previous users of whistle 16. In one embodiment, mouthpiece cover sticker 150 additionally includes text or graphical indicia indicating the use and/or purpose of sticker 150. In one embodiment, sticker indicia include text such as "clean as a whistle" or "remove before blowing." Other indicia can also be included on sticker 150 over the mouthpiece as desired.

Figure 4A:
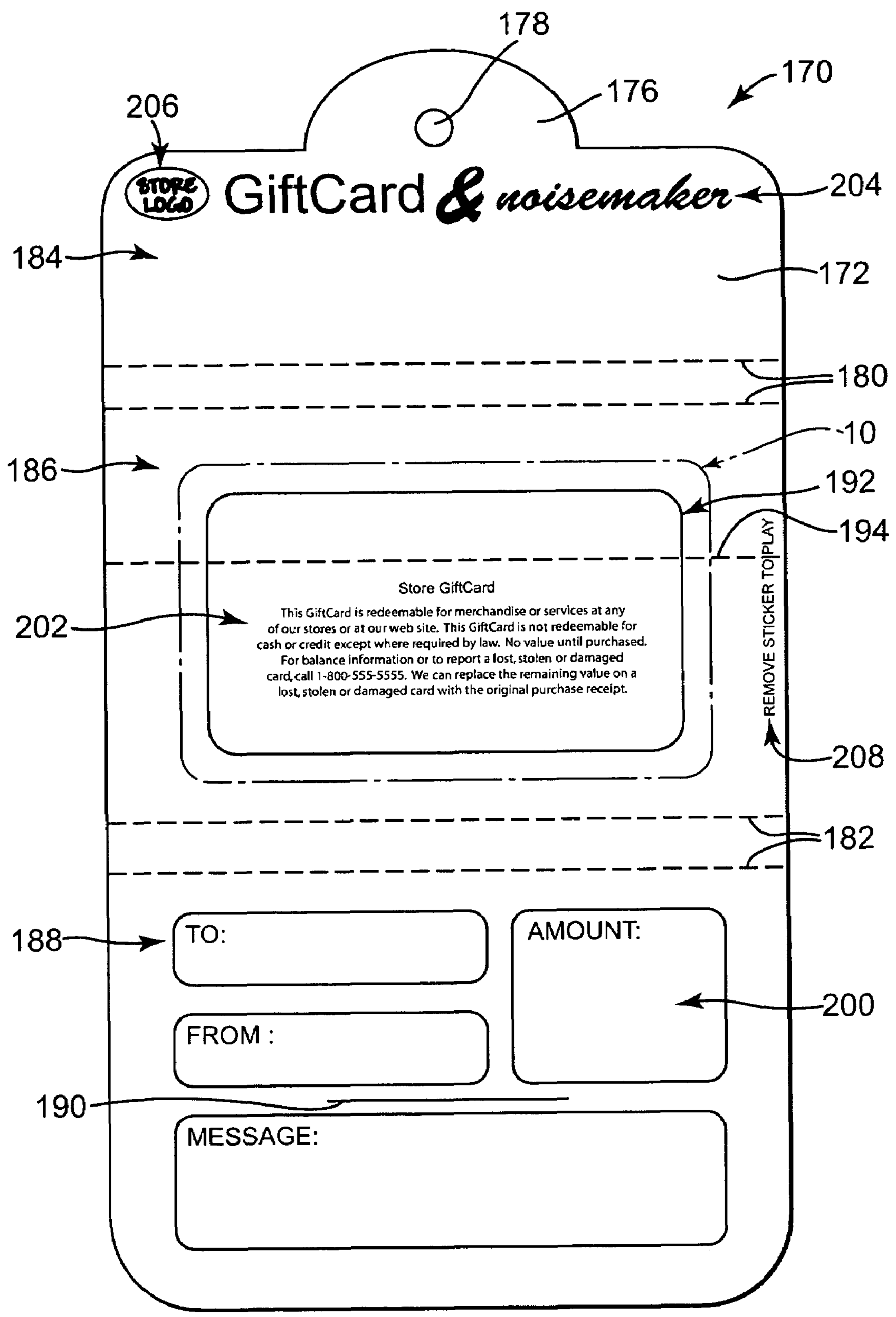
FIG. 4A is a front view of one embodiment an unfolded carrier for a stored-value card, according to the present invention.
Figure 4B:
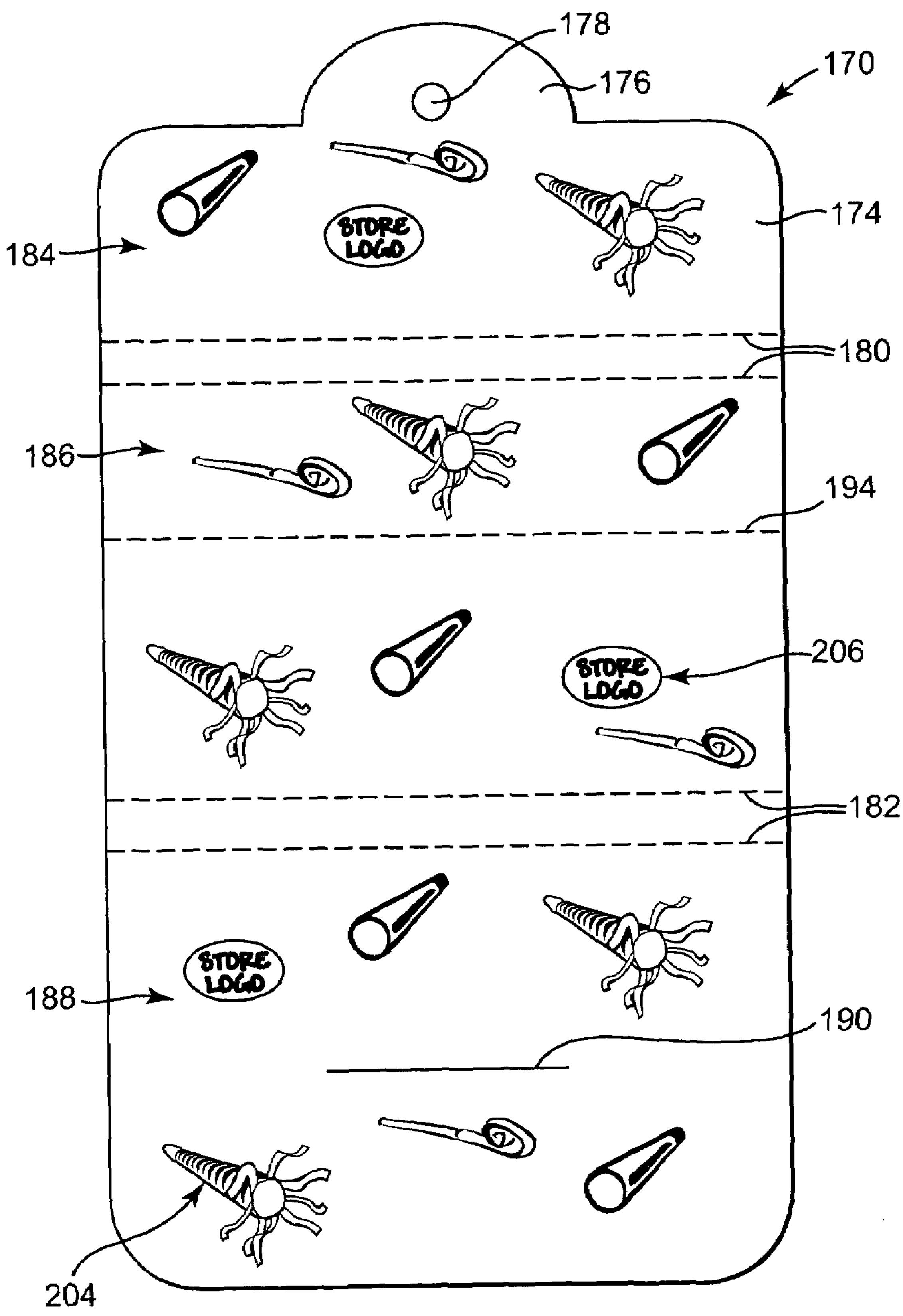
FIG. 4B is a back view of the unfolded carrier of FIG. 4B.

FIGS. 4A and 4B illustrate a carrier or backer 170 for supporting stored-value card 10 in an unfolded or open configuration. Backer 170 comprises a single layer or multiple layers of paper or plastic material, for example, substantially in the form of a relatively stiff but bendable/flexible card. Use of other materials is also contemplated. In one embodiment, backer 170 is a substantially planar substrate having a substantially elongated or rectangular shape. Accordingly, backer 170 defines a first surface 172 (FIG. 4A) and a second surface 174 (FIG. 4B) opposite first surface 172. A tab 176 is substantially centered at a first lateral end of backer 170. In one example, a support arm aperture 178 is defined within tab 176 and is configured to receive a support arm or hook. As such, an open backer 170 can be hung on the support arm or hook for display in a retail store.

Fold lines 180 and 182 each extend laterally across backer 170 and are spaced longitudinally from one another. More specifically, fold lines 180 are positioned relatively near tab 176 as compared to fold lines 182. A first panel 184, a second or intermediate panel 186, and a third panel 188 are defined by the position of fold lines 180 and 182. First panel 184 extends from fold lines 180 away from fold line 182 and includes tab 176. Second or intermediate panel 186 extends between fold lines 180 and 182. Third panel 188 extends from fold lines 182 in a direction opposite fold lines 180. A laterally extending slit 190 is laterally centered on third panel 188.

First surface 172 includes indicia 192 generally indicating where stored-value card 10 (illustrated in FIG. 1) will be adhered to first surface 172 of intermediate panel 186. In one example, indicia 192 are longitudinally centered on intermediate panel 186. In one embodiment, backer 170 additionally includes a fold line 194 laterally extending across intermediate panel 186, more particularly across indicia 192 of intermediate panel 186.

In one embodiment, backer 170 displays additional indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information. For example, first surface 172 includes indicia 200, 202, 204, 206 and/or 208. Indicia 200 include to, from, initial gift card value, and message fields.

Indicia 202 indicate that stored-value card 10 is redeemable for the purchase of goods and/or services and that, upon use, a value of the purchased goods and/or services will be deducted from the financial account or record linked to stored-value card 10. In one embodiment, indicia 202 include phrases such as "<NAME OF STORE> GIFTCARD" and "This GiftCard is redeemable for merchandise or services at any of our stores or at our website," and/or provides help or phone line information in case of a lost, stolen, or damaged stored-value card 10, etc.

Indicia 204 are decorative indicia that generally improve the aesthetic appeal of backer 170. In one embodiment, decorative indicia 204 are positioned and configured to correspond with decorative indicia 144 of stored-value card 10. In one example, decorative indicia 204 additionally or alternatively include a printed text or character reference to the whistle or noisemaker function of stored-value card 10. Indicia 206 identify a store, brand, department, media title or logo, e.g. a title or logo of a move, book television show, video game, etc. associated with stored-value card 10, etc. In one embodiment, indicia 206 are additionally or alternatively included on first surface 172 and second surface 174 of backer 170.

Indicia 208 instruct or otherwise inform a card bearer of how to access or use stored-value card 10. In one example, indicia 208 include a statement such as "Remove Sticker to Play" or other statements that instruct the card bearer to remove sticker 150 before using stored-value card 10 as a whistle. Additional information besides that specifically described and illustrated herein may also be included. Other indicia, e.g. indicia promoting that stored-value card 10 includes a whistle or that value can always be reloaded to stored-value card 10, are also contemplated. Any of indicia 200, 202, 204, 206, 208, or other indicia, optionally may appear anywhere on backer 170 or stored-value card 10.

Backer 170 is configured to receive stored-value card 10 on first surface 172 of intermediate panel 186 as illustrated in phantom lines in FIG. 4A. In particular, stored-value card 10 is releasably adhered or otherwise secured to intermediate panel 186. Stored-value card 10 and backer 170 collectively define a stored-value card assembly 210 (illustrated in FIG. 5). In one embodiment, backer 170 is hung from a support arm or hook for display in a retail setting in a manner in which at least stored-value card 10 and a portion of first surface 172 of backer 170 is visible to potential consumers.

Figure 5:
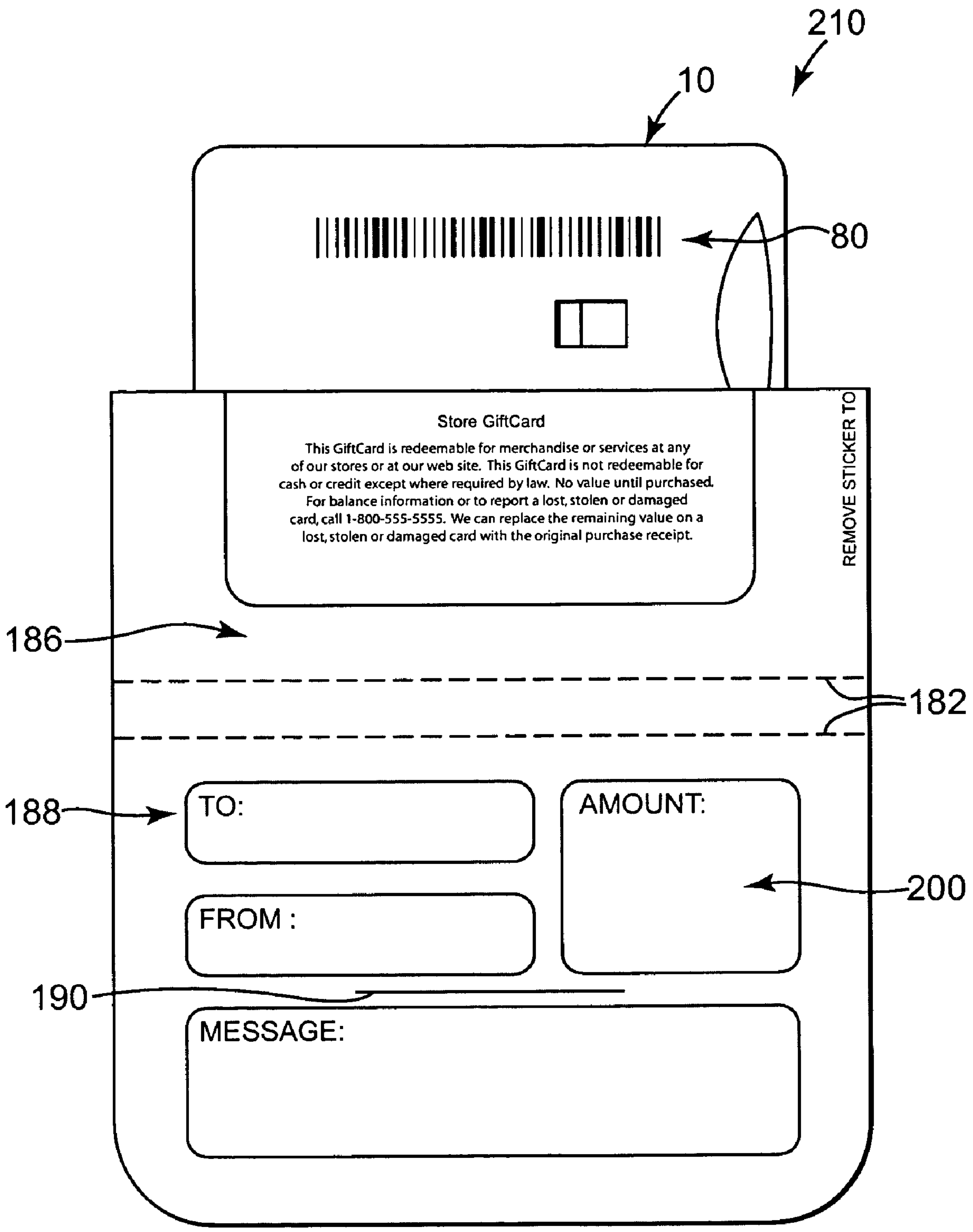
FIG. 5 is a back view of the carrier of FIG. 4A partially folded and supporting a stored-value card, according to the present invention

During purchase, third panel 188 and an adjacent portion of intermediate panel 186 are folded back about fold line 194 as illustrated in FIG. 5 to expose a portion of outside surface 40 of stored-value card 10. In particular, the exposed portion of outside surface 40 includes account identifier 80. As previously described, account identifier 80 is adapted for accessing a financial account or record associated with stored-value card 10 for activating, loading, or debiting from the account or record. Accordingly, by folding backer 170 about fold line 194, account identifier 80 is accessible to activate and/or load stored-value card 10 without removing stored-value card 10 from backer 170.

Backer 170 is configured such that after purchase first panel 184 and third panel 188 are foldable about fold lines 180 and 182, respectively, to enclose or selectively wrap stored-value card 10 as desired. More particularly, third panel 188 is rotated about fold lines 182 so that first surface 172 of third panel 188 is moved towards first surface 172 of intermediate panel 186. Then, first panel 184 is rotated about fold lines 180 so that first surface 172 of first panel 184 is moved toward first surface 172 of intermediate panel 186. In this respect, first panel 184 at least partially overlaps third panel 188. Tab 176 is slid into slit 190 of third panel 188 to selectively lock backer 170 in a folded or closed position (not shown) about stored-value card 10. Folding of first and third panels 184 and 188 of backer 170 in the opposite directions about fold lines 180 and 182 for display in a retail store is also contemplated.

When in the folded position, stored-value card 10 is selectively wrapped for presentation to a recipient of stored-value card 10. Upon receipt, the recipient unfolds backer 170 to access stored-value card 10. Accordingly, recipient or other bearer can use whistle 16 of stored-value card 10. Backers similar to backer 170 can be used with various sizes and shapes of stored-value card 10. Other backers or packages are also contemplated for supporting and/or substantially enclosing stored-value card 10.

Figure 6:
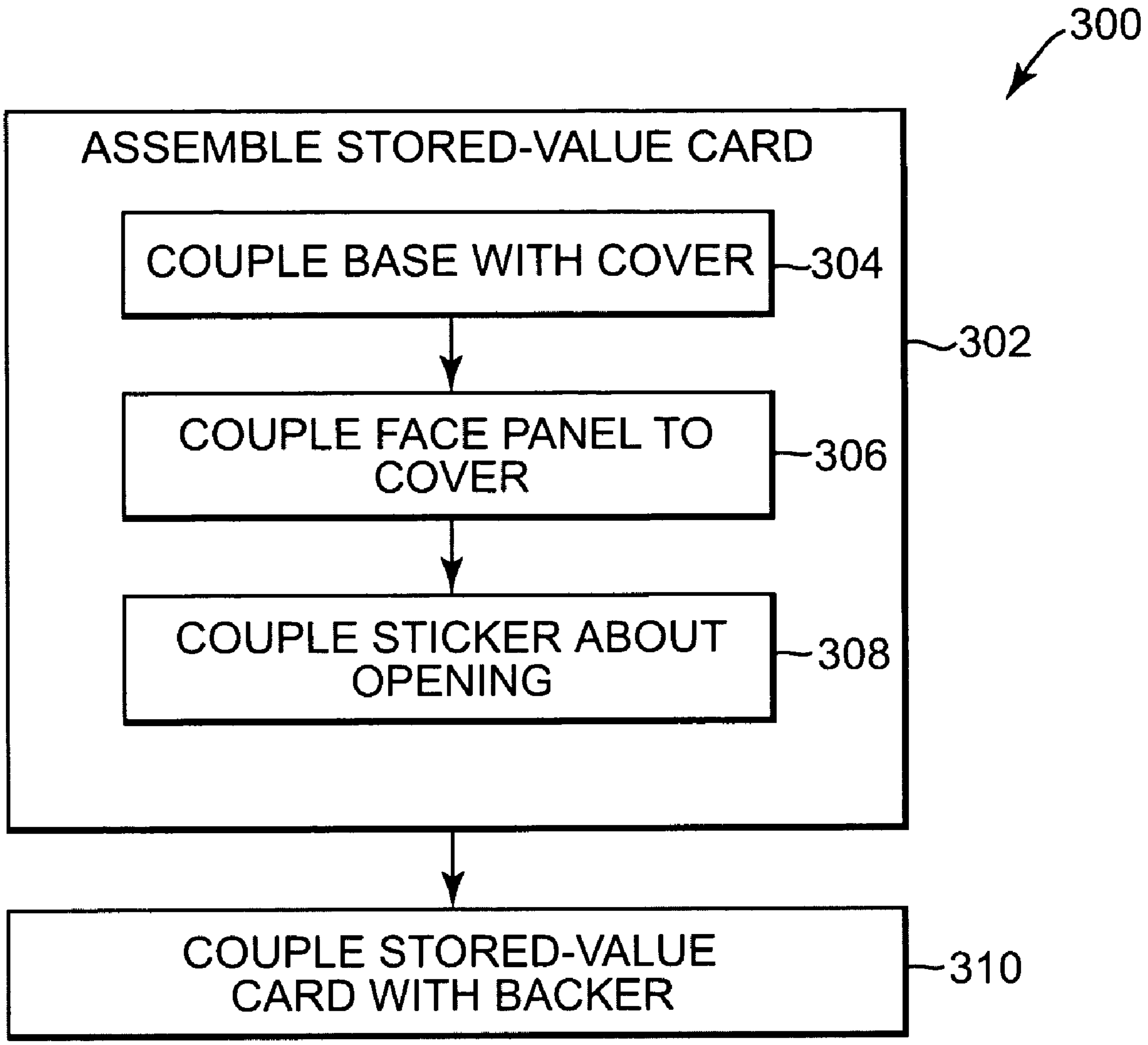
FIG. 6 is a flow chart illustrating one embodiment of a method of assembling a stored-value card, according to the present invention.

FIG. 6 is a flow chart illustrating one embodiment of a method 300 of assembling stored-value card 10 with backer 170. Referring to FIG. 6 in view of FIG. 1, at 302, stored-value card 10 is assembled. In particular, in one embodiment, base 20 is coupled with cover 22 by interfacing inside edge 44 of base 20 with inside edge 104 (illustrated in FIG. 3A) of cover 22. As described above, coupling base 20 and cover 22 interfaces inside edge 62 of internal walls 50 with inside edge 120 of internal walls 110 (illustrated in FIG. 3A) and aligns opening 60 with opening 118 (illustrated in FIG. 3A) to collectively define whistle 16.

At 306, face panel 14 is coupled to cover 22. More specifically, face panel 14 is adhered to cover 22 within panel indentation 130. In one embodiment, face panel 14 is omitted and decorative indicia 144 and/or brand indicia 146 are printed directly to cover 22. In such an embodiment, operation 306 may be eliminated. In one example, face panel 14 is coupled to cover 22 prior to coupling base 20 with cover 22 at 304. At 308, sticker 150 is adhered to housing 12 about opening 60 and 118. In particular, in one embodiment, sticker 150 is adhered to base 20 about opening 60 and to cover 22 about opening 118. In one example, sticker 150 is selectively adhered to housing 12, such that a bearer of stored-value card 10 can subsequently remove sticker 150 to access openings 60 and 118 to blow or otherwise introduce air into whistle 16.

At 310, the assembled stored-value card 10 is coupled with backer 170 to form stored-value card assembly 210. In one example, stored-value card 10 is coupled to backer 170 with an adhesive or other selectively releasable material or device. In one embodiment, backer 170 is folded into a folded position for shipment and/or display to retail settings. Backer 170 is, more specifically, folded by folding backer 170 about fold line(s) 180 to mate the backer surfaces illustrated in FIG. 4B. As such, a portion of backer 170 with stored-value card 10 is visible from one side of folded backer 170. Backer 170 can also be folded in the opposite direction about fold line(s) 180 to substantially enclosed stored-value card 10. In one embodiment, backer 170 is displayed in an unfolded position hung from a support arm via support arm aperture 178.

Figure 7:
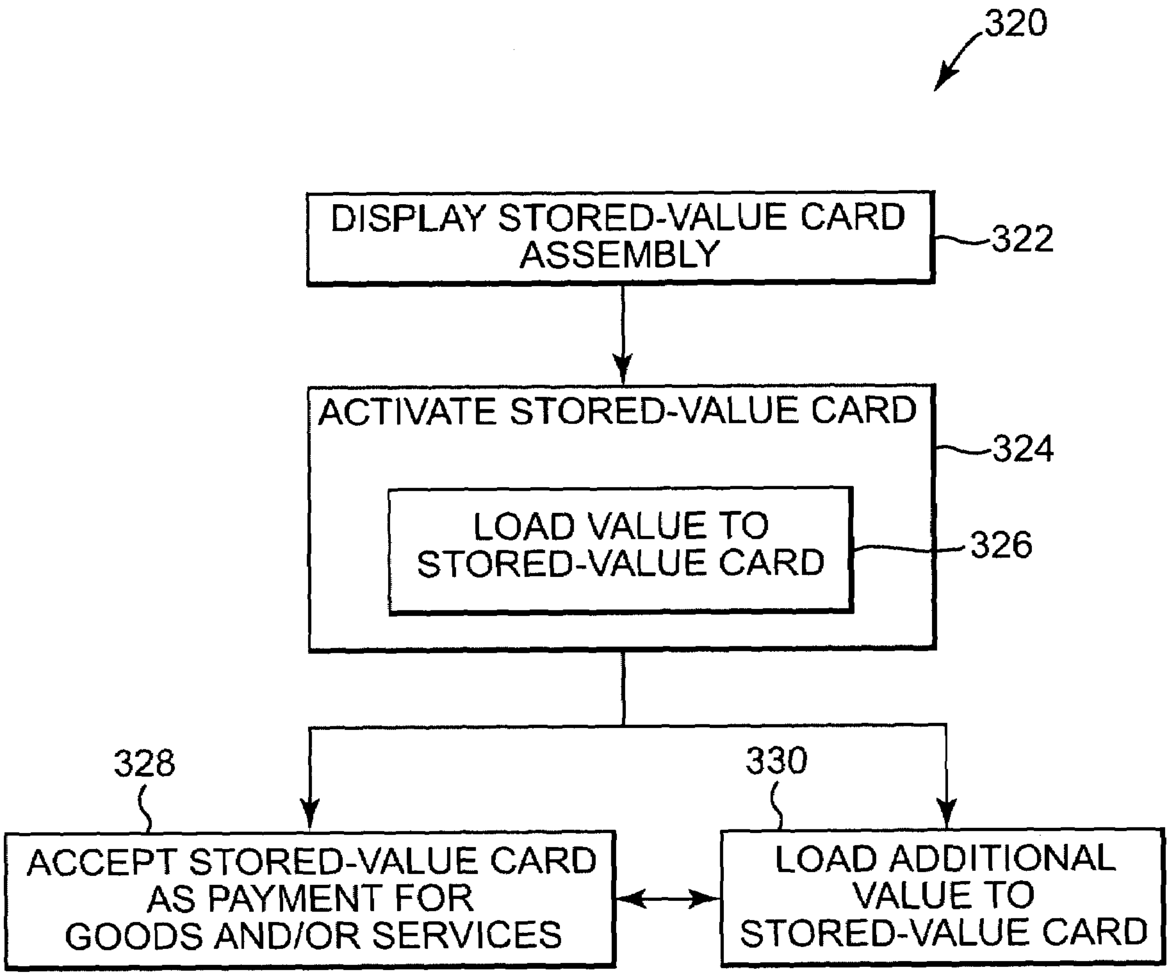
FIG. 7 is a flow chart illustrating one embodiment of a method of providing a stored-value card, according to the present invention.

FIG. 7 is a flow chart illustrating one embodiment of a method 320 of providing stored-value card assembly 210 for sale to and use by consumers. At 322, stored-value card assembly 210 is placed or hung from a rack, shelf, or similar device to display stored-value card assembly 210 for sale to potential consumers. In one example, stored-value card assembly 210 is placed for sale such that stored-value card 10 is visible to potential consumers. In one embodiment, a depiction of stored-value card assembly 210 is placed on a website for viewing and purchase by potential consumers. In one embodiment, stored-value card 10 is displayed without backer 170.

At 324, a consumer, who has decided to purchase stored-value card 10, presents the stored-value card 10 to a retail store employee, retail store kiosk, or other person or device to fold backer 170 and scan account identifier 80 of stored-value card 10 to access the financial account or record linked to account identifier 80. Upon accessing the financial account or record, at 326, the account or record is accessed and value is added to the financial account or record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website.

At 328, the retail store or other affiliated retail setting or website accepts stored-value card 10 as payment towards the purchase of goods and/or services made by the current bearer of stored-value card 10. In particular, the value currently loaded on stored-value card 10 is applied towards the purchase of goods and/or services. At 330, additional value is optionally loaded on stored-value card 10 at a point-of-sale terminal, kiosk, or other area of the retail store or related setting. Upon accepting stored-value card 10 as payment at 328, the retail store or related setting can subsequently perform either operation 328 again or operation 330 as requested by a current bearer of stored-value card 10. Similarly, upon loading additional value to stored-value card 10 at 330, the retail store or related setting can subsequently perform either operation 330 again or operation 328. In one example, the ability to accept stored-value card 10 as payment for goods and/or services is limited by whether the financial account or record associated with stored-value card 10 has any value at the time of attempted redemption.

Figure 8:
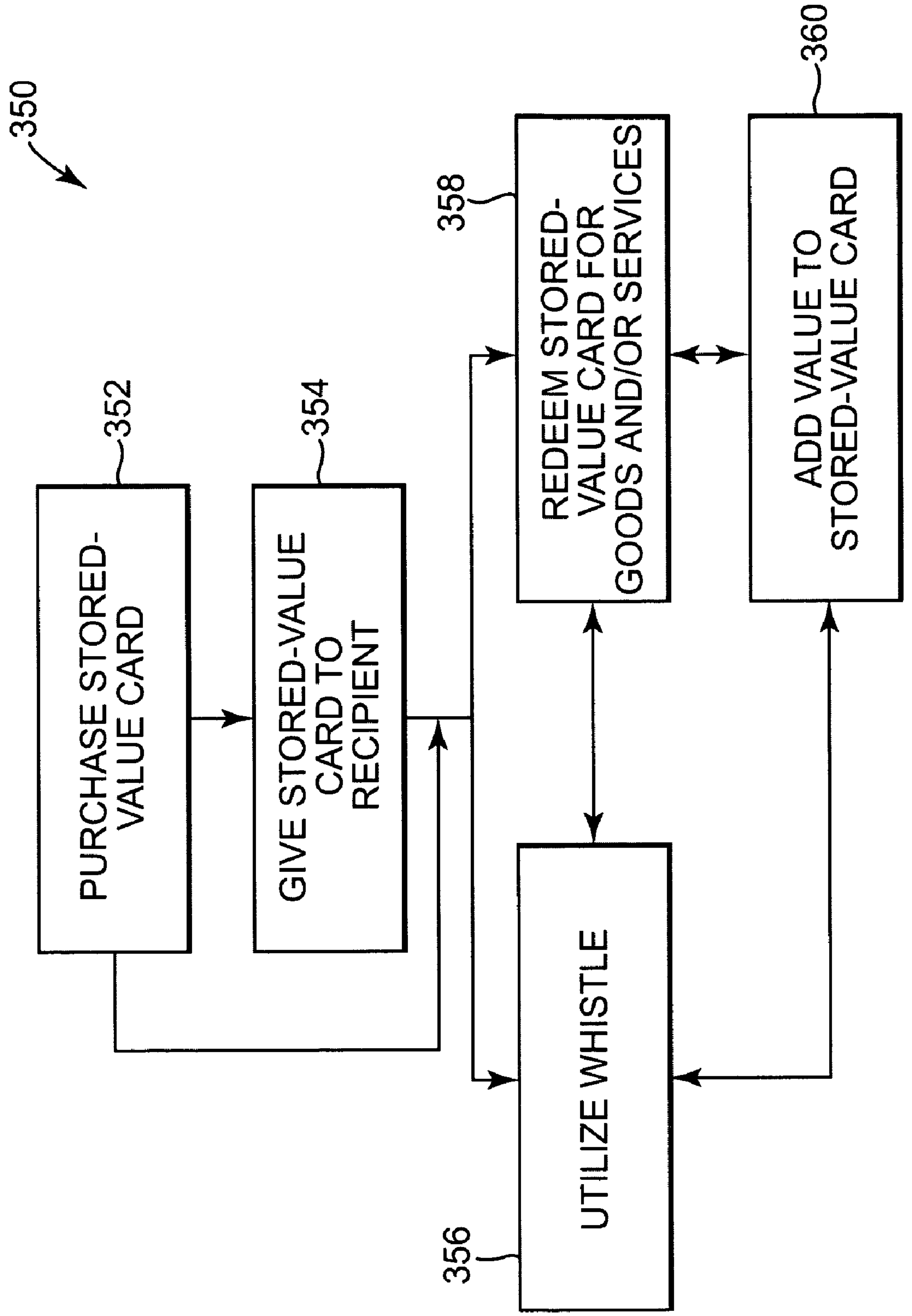
FIG. 8 is a flow chart illustrating one embodiment of a method of using a stored-value card, according to the present invention.

FIG. 8 is a flow chart illustrating one embodiment of a method 350 of using stored-value card 10. At 352, a potential consumer of stored-value card 10, which is displayed in a retail store or viewed on a website, decides to and does purchase stored-value card 10 from the retail store or website setting. Stored-value card 10 can be displayed and purchased alone or as part of stored-value card assembly 210. Upon purchasing of stored-value card 10, a retail store employee, retail store kiosk, or other person or device folds backer 170 to reveal account identifier 80. Account identifier 80 is scanned to access the financial account or record linked to account identifier 80 and to thereby activate or load value onto stored-value card 10.

At 354, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers (such as at a child's birthday, New Year's Eve party, etc.) as party favors or gifts. As an alternative, the consumer can keep stored-value card 10 for his or her own use.

At 356, the consumer or recipient, whoever is in current ownership or otherwise is the current bearer of stored-value card 10, removes stored-value card 10 from backer 170 if stored-value card 10 is coupled with backer 170. The current bearer of stored-value card 10 removes sticker 150 from housing 12 and blows into or otherwise introduces air into the airflow chamber 52 of whistle 16 via an opening collectively defined by openings 60 and 118. Air introduced into airflow chamber 52 moves through airflow chamber 52 over at least a portion of ramps 72 and/or 126 and beveled surfaces 66, 68, and 122 and out exit opening 64. The serpentine or generally non-linear movement of air through airflow chamber 52 causes a whistle sound to be produced, which in turn generally amuses the bearer of stored-value card 10.

At 358, the current bearer of stored-value card 10 redeems stored-value card 10 for goods and/or services from the retail store or website. At 360, the current bearer of stored-value card 10 optionally adds value to stored-value card 10, and more particularly, to the financial account or financial record associated with stored-value card 10, at the retail store or over the Internet. Upon utilizing whistle 16 at 356, redeeming stored-value card 10 at 358, or adding value to stored-value card 10 at 360, the current bearer of stored-value card 10 subsequently can perform any of operations 356, 358, or 360 as desired. In one embodiment, the ability of the current bearer to repeat redeeming stored-value card 10 at 358 is limited by whether the financial account or record associated with stored-value card 10 has any value at the time of attempted redemption.

Although described above as occurring at single retail store or website, in one embodiment, purchasing stored-value card 10 at 352, redeeming stored-value card 10 at 358, and adding value to stored-value card 10 at 360, can each be performed at any one of a number of stores adapted to accept stored-value card 10 or over the Internet. In one example, the number of stores are each a part of a chain or similarly branded stores. In one example, the number of stores includes at least one website and/or at least one conventional brick and mortar store.

Stored-value cards come in many forms, according to embodiments of the invention. The gift card, like other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value card. The balance associated with a stored-value card declines as the card is used, encouraging repeat visits. The card remains in the user's purse or wallet, serving as an advertisement or reminder to re-visit the associated merchant. Gift cards, according to embodiments of the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards, and other types of cards associated with or representing purchasing power or monetary value, for example.

Although the invention has been described with respect to particular embodiments, such embodiments are for illustrative purposes only and should not be considered to limit the invention. Various alternatives and changes will be apparent to those of ordinary skill in the art. For example, stored-value card 10 optionally is made of plastic, paper, generally stiff paper, other substrate, or the like. Adding value to stored-value card 10 optionally includes adding either a fixed amount or an amount that can be chosen by the customer or other user. Other modifications within the scope of the invention in its various embodiments will be apparent to those of ordinary skill.

What is claimed is:

1. A stored-value card comprising:

a housing including an account identifier signifying a financial account or record linked to the stored-value card; and at least one internal wall substantially enclosed within the housing and configured to define an airflow chamber within the housing;

wherein the housing defines an opening leading into the airflow chamber, and further wherein the stored-value card is configured to produce a whistle sound when air enters the airflow chamber from the opening and moves within the airflow chamber.

2. The stored-value card of claim 1, wherein the housing defines a first primary panel and a second primary panel, the at least one internal wall extending between the first primary panel and the second primary panel to define the airflow chamber between the at least one internal wall, the first primary panel, and the second primary panel.

3. The stored-value card of claim 2, wherein the housing includes:

a cover defining the first primary panel; and a base coupled to the cover and defining the second primary panel.

4. The stored-value card of claim 3, wherein the at least one internal wall is collectively formed by the cover and the base.

5. The stored-value card of claim 3, wherein the cover and the base collectively define the opening.

6. The stored-value card of claim 1, wherein the at least one internal wall comprises a plurality of internal walls configured to define the airflow chamber between the first primary panel and the second primary panel, and each of the plurality of internal walls is enclosed within the housing.

7. The stored-value card of claim 1, wherein the opening is an entrance opening; further wherein the housing defines an exit opening spaced from the entrance opening, the exit opening extending into the airflow chamber and configured to allow airflow to exit the airflow chamber.

8. The stored-value card of claim 1, further comprising:

at least one of a bevel and a ramp defined within the airflow chamber and configured to influence the flow of air through the airflow chamber.

9. The stored-value card of claim 1, wherein the airflow chamber is the only airflow chamber enclosed within the housing.

10. The stored-value card of claim 1, further comprising:

a sanitary sticker applied to the housing over the opening.

11. The stored-value card of claim 1, wherein the housing and the at least one internal wall are each substantially rigid.

12. The stored-value card of claim 1 in combination with a backer coupled to the stored-value card.

13. The stored-value card of claim 1, wherein the housing is tapered near the opening.

14. The stored-value card of claim 1, wherein the housing is sized to fit within a wallet.

15. A whistle comprising:

means for defining an airflow chamber; and means for substantially enclosing the means for defining and including:

means for externally accessing the means for defining, and means for linking the whistle with a financial account or financial record;

wherein air enters the airflow chamber through the means for externally accessing and travels within the airflow chamber to produce a whistle sound.

16. The whistle of claim 15, wherein the means for defining comprise means for interrupting an otherwise linear flow of air through the means for defining.

17. The whistle of claim 15, wherein the means for externally accessing the airflow chamber includes:

means for introducing air into the airflow chamber, and means for exiting air from the airflow chamber.

18. A method of encouraging purchase and facilitating use of a financial transaction card linked to a financial account or a financial record, the method comprising:

displaying a financial transaction card to a potential consumer, the financial transaction card including a housing that substantially encloses a whistle;

displaying decorative indicia associated with the financial transaction card and indicating that the financial transaction card includes a whistle.

activating the financial transaction card to permit deductions from the financial account or the financial record; and receiving the financial transaction card as payment for goods or services, the value of the goods or services being deducted from the financial account or the financial record.

19. The method of claim 18, wherein displaying a financial transaction card to a potential consumer includes providing the financial transaction card with a base and a cover coupled together to define the whistle therebetween.

20. The method of claim 18, wherein displaying a financial transaction card to a potential consumer includes providing the financial transaction card with a removable sanitary sticker positioned over an opening of the financial transaction card, the opening forming a portion of the whistle.

* * * * *